(12) United States Patent
Morikawa

(10) Patent No.: US 6,997,060 B2
(45) Date of Patent: Feb. 14, 2006

(54) LOAD-DETECTING DEVICE

(75) Inventor: Kenji Morikawa, Hekinan (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 11/073,486

(22) Filed: Mar. 4, 2005

(65) Prior Publication Data

US 2005/0193828 A1   Sep. 8, 2005

(30) Foreign Application Priority Data

Mar. 4, 2004 (JP) .............................. 2004-060774

(51) Int. Cl.
*G01B 7/16* (2006.01)

(52) U.S. Cl. .......................................... 73/775

(58) Field of Classification Search .................. 73/777, 73/760, 768, 774, 775
See application file for complete search history.

(56) References Cited

U.S. PATENT DOCUMENTS

| | | | |
|---|---|---|---|
| 5,684,254 A * | 11/1997 | Nakazaki et al. ............. | 73/774 |
| 6,169,479 B1 * | 1/2001 | Boran et al. ................. | 73/1.15 |
| 6,520,023 B1 * | 2/2003 | Kimura ........................ | 73/795 |
| 2004/0020701 A1 * | 2/2004 | Aoki ............................ | 180/274 |
| 2004/0074306 A1 | 4/2004 | Kinoshita et al. ............. | 73/774 |
| 2004/0094337 A1 | 5/2004 | Saito et al. ................... | 177/184 |
| 2004/0129479 A1 * | 7/2004 | Ozaki ........................... | 180/274 |
| 2004/0186643 A1 * | 9/2004 | Tanaka et al. ............... | 180/274 |
| 2005/0021192 A1 * | 1/2005 | Takafuji et al. .............. | 701/1 |

FOREIGN PATENT DOCUMENTS

| | | |
|---|---|---|
| JP | 11-28994 | 2/1999 |
| JP | 2000-346723 | 12/2000 |

* cited by examiner

*Primary Examiner*—Max Noori
(74) *Attorney, Agent, or Firm*—Harness, Dickey & Pierce, PLC

(57) ABSTRACT

A load-detecting device includes a supporting member, a load transfer member, a load sensor, and a load sensor supporting member. The load transfer member is supported by the supporting member and includes an elastic displacement area in which an elastic displacement is generated upon receiving a force from a predetermined direction. The load sensor contacts the elastic displacement area of the load transfer member. The load sensor detects a load based on the elastic displacement. The load sensor supporting member supports the load sensor and is connected to the supporting member. The load transfer member, the load sensor, and the load sensor supporting member are provided in this order along the predetermined direction. The supporting member is provided so as not to be in contact with the load sensor. The load transfer member has a lower stiffness in the predetermined direction than the load sensor.

7 Claims, 6 Drawing Sheets

LOAD-DETECTING DEVICE

CROSS REFERENCE TO RELATED APPLICATIONS

This application is based upon and claims the benefit of priority of Japanese Patent Application No. 2004-60774, filed on Mar. 4, 2004, the contents of which are incorporated herein by reference.

FIELD OF THE INVENTION

The present invention relates to a load-detecting device and, more particularly, to a load-detecting device for detecting an impact to a vehicle that is applied in a predetermined direction.

BACKGROUND OF THE INVENTION

As can be seen from an automobile equipped with a seat belt and/or an air bag for ensuring the safety of a passenger, the importance of safety has been recently recognized and safety measures have been taken. As a result, a passenger mortality rate has been declining in recent years. On the other hand, although the development of safety measures for pedestrians is relatively slower than various measures for protecting passengers, its technical development is in progress.

The air bag for protecting a passenger is already known. In addition, there is the following request for the air bag. After the weight on a front passenger seat of a vehicle is detected so as to determine whether a passenger is an adult or a child, the inflation of the air bag is controlled so as to achieve both the protection performance for an adult passenger and the reduction of damages to a child passenger (Japanese Patent Laid-Open Publication No. Hei 15-240632). For such control, it is necessary to provide a load sensor for passenger detection under a passenger seat so as to first detect a weight applied to the passenger seat and then to determine whether the passenger is an adult or a child based on the detected weight. As a result, it is possible to control the inflation of the air bag in accordance with the detected weight. For example, if the detected weight exceeds a predetermined weight, the passenger is determined to be an adult to inflate the air bag with a normal amount of gas. On the other hand, if the detected weight is less than the predetermined weight, the passenger is determined to be a child. In this case, the inflation of the air bag can be controlled so as not to inflate the air bag at all, to inflate it with a reduced amount of gas or the like.

Moreover, as a technique for protecting a pedestrian, a technique for preventing a pedestrian from hitting his or her head against a vehicle hood during a car crash has been developed (Japanese Patent Laid-Open Publication No. Hei 11-028994). According to this technique, in a car crash involving a pedestrian, an impact load is detected so as to open the hood of a vehicle, to inflate an air bag over the hood or the like. In order to actuate such a safety mechanism, it is necessary to detect whether an object colliding against the bumper of a vehicle is a human or not. In this case, for example, if a load sensor is provided for a vehicle bumper, a weight of a colliding object is detected based on a weight detected by the load sensor in the case of collision against the bumper. Then, if the weight is equivalent to a human body weight, the above-mentioned safety mechanism can be actuated.

It is desirable that the load sensor in the above-mentioned techniques be constituted so as to have a high sensitivity to a load from one certain direction but not to react to a load from the other directions. For example, in the case of the load sensor for passenger detection provided under a front passenger seat, it is desirable that only a weight on the passenger seat be detected. If a load from the other directions, for example, from a longitudinal direction of a vehicle or the like is detected, the weight on the passenger seat cannot be precisely measured. Therefore, the control of inflation of the air bag as described above and the like cannot be accurately performed. Moreover, in the case of the load sensor provided for the bumper, for detecting the weight of an object colliding against the bumper, if a load applied in the direction other than the longitudinal direction of the vehicle, for example, a load applied in the vertical direction of the vehicle is detected, the load is detected even by vertical vibration generated when the vehicle is traveling on a bad road. As a result, there is a possibility the above-described safety mechanism may be erroneously actuated to open a hood, to inflate an air bag on the hood, or perform some other safety measure.

To cope with such problems, the above-cited Japanese Patent Laid-Open Publication No. Hei 15-240632 suggests a structure for reducing an unnecessary load applied in a direction orthogonal to a load detection direction. Japanese Patent Laid-Open Publication No. Hei 15-240632 discloses weight measuring equipment wherein a load is applied to a load detecting unit for converting a load into the amount of electricity by a bending strain through a flat spring forming a cantilevered beam. Since the detection sensitivity greatly varies depending on a stiffness ratio of the flat spring to the detecting unit, a length of the flat spring and the like, the components and the assembly of the components require high accuracy, resulting in high cost. Moreover, there is another problem that, for example, a large detection dynamic range cannot be ensured for the strength in the case where a tensile load is applied in the same direction as a load detection direction.

Furthermore, the above-cited Japanese Patent Laid-Open Publication No. Hei 15-240632 discloses a detection device for detecting an impact on a bumper. A load sensor is provided over the entire bumper in Japanese Patent Laid-Open Publication No. Hei 15-240632. However, since the shape and size of bumpers differ for each type of vehicle, the arrangement of a load sensor is required to be designed for each type of vehicle. Moreover, since the area required to place the load sensor is large, the cost is disadvantageously elevated. It is conceivable to provide the load sensor between a bumper reinforcement (hereinafter, also referred to as a bumper R/F) in a vehicle and a pair of front side members so as to avoid the above-mentioned problem. However, the bumper R/F supports a member for absorbing an impact on the front side of a vehicle and, therefore, must have a high stiffness and a large mass. Accordingly, a shearing force in the vertical direction of the vehicle such as the weight of the bumper R/F, vertical vibration and the like are exerted on the load sensor so that the load sensor detects them as disturbance noises. As a result, an impact load cannot be detected with high accuracy.

SUMMARY OF THE INVENTION

The present invention is devised in view of the above problems and has an object of providing a load-detecting device forming a high-strength structure as a whole, which hardly detects a load from directions other than a load detection direction and is capable of detecting a load from the load detection direction with high accuracy.

In order to achieve the above object, a load-detecting device according to the present invention includes a load transfer member supported by a supporting member so as to include an elastic displacement area in which an elastic displacement is generated upon application of a force from a predetermined direction. Furthermore, the load-detecting device includes a load sensor provided in contact with the elastic displacement area of the load transfer member, the load sensor being for detecting a load with the elastic displacement. Further yet, the load-detecting device includes a load sensor supporting member for supporting the load sensor, the load sensor supporting member being in connection with the supporting member, the load transfer member, the load sensor, and the load sensor supporting member being provided in this order in the predetermined direction. The supporting member is provided so as not to be in contact with the load sensor and the load transfer member has a lower stiffness in the predetermined direction than the load sensor.

In the load-detecting device according to the present invention, the load sensor is interposed between the elastic displacement area of the load transfer member and the load sensor supporting member. By application of a load to the load transfer member, elastic deformation occurs in the elastic displacement area of the load transfer member. A load based on the amount of deformation is applied to the load sensor. At this time, the load sensor has a higher stiffness than that of the load transfer member. As a result, a load quota allocated to the load sensor is increased, whereas a load quota allocated the load transfer member is correspondingly reduced. Therefore, load detection with a high sensitivity is made possible.

Herein, the load quota indicates the amount of a load allocated to each member when a certain load F is applied to a structure composed of a plurality of members. For example, in the case of two members connected to each other in a load application direction as described above, when the load F from the load application direction is applied, a first member and a second member elastically deform to cause elastic displacements, $\delta 1$ and $\delta 2$, respectively. It is assumed that a load quota allocated to the first member and that allocated to the second member are $F1$ and $F2$, respectively. Then, the following relationships are established:

$F1 = F \times \{\delta 2/(\delta 1 + \delta 2)\}$; and $F2 = F \times \{\delta 1/(\delta 1 + \delta 2)\}$.

As can be seen from the above formulae, the load quota decreases as the member has larger elastic deformation. Specifically, a larger load quota is allocated to a member with a higher stiffness. In the present invention, since the load sensor has a higher stiffness than that of the load transfer member, a larger load quota is allocated to the load sensor for the applied load F. Therefore, the load detection with a high sensitivity and high accuracy is made possible.

The load transfer member and the load sensor supporting member, which interpose the load sensor therebetween, are connected to each other through the supporting member. As a result, the load sensor has a structure with a high stiffness against a load generated in a shearing direction perpendicular to the load detection direction, which acts on the load transfer member and the load sensor supporting member interposing the load sensor therebetween. As a result, a variation in the detected load, which may be generated by a load from a direction other than the load detection direction, can be kept small. Accordingly, load detection with high accuracy is made possible.

In the load-detecting device according to the present invention, the supporting member may have a lower stiffness in the predetermined direction than that in a different direction. It is desirable that the supporting member be elastically deformable in the predetermined direction in which the load is applied (the load detection direction of the load sensor) while having a high stiffness for the other directions (in this case, a radial direction regarding the predetermined direction as a central axial line). The load-detecting device according to the present invention detects a load from the predetermined direction, whereas it does not detect a load from the other directions. Therefore, the stiffness of the supporting member in the directions other than the detection direction is increased so that a load from the directions other than the detection direction is not transferred to the load sensor. As a result, the load-detecting device according to the present invention can detect a load from the predetermined direction with good accuracy. The increased stiffness in the directions other than the predetermined direction can be relatively easily achieved by, for example, increasing a thickness in the directions other than the predetermined direction, changing a material or the like.

In the load-detecting device of the present invention, the load sensor may be provided in contact with a center of gravity of the elastic displacement area. The position of the center of gravity of the elastic displacement area corresponds to the maximum displacement point of the area. By providing the load sensor in contact with the maximum displacement point, a load is most efficiently transferred from the load transfer member. As a result, the load sensor can detect a load with high accuracy.

In the load-detecting device according to the present invention, the supporting members may be symmetrically provided about an axial line extending in the predetermined direction from the center of gravity of the elastic displacement area. The position of the center of gravity of the elastic displacement area corresponds to the maximum displacement point in the area, as described above. Therefore, if the supporting members are arranged so as to be symmetrical about the maximum displacement point, the load quotas can be allocated to the respective supporting members in a well-balanced manner, thereby providing stable support for the load transfer member. Specifically, the entire load-detecting device can be constructed to have a high strength against a load from the load detection direction.

In the load-detecting device according to the present invention, the load sensor may be formed of zirconia and $La_{1-x}Sr_xMnO_3$ ($0 \leq x \leq 1$) having a pressure resistance effect as chief materials. The load sensor is formed by using zirconia particles as a matrix material and having $La_{1-x}Sr_xMnO_3$ particles, which serve as a pressure resistance material, dispersed therein so as to be electrically continuous. As a result, an ohmic resistance is varied based on the application of a load to enable the load detection based on the variation in ohmic resistance. Since zirconia has an excellent heat resistance and, therefore, hardly induces a variation in temperature in the sensor, a detection error due to a variation in temperature in the sensor is hardly generated. Moreover, since zirconia has toughness, a sensor structure having an extremely high resistance against breakage due to a load or a pressure can be obtained. Furthermore, in the present invention, an increased strength of the load sensor also contributes to the increase in stiffness of the entire load-detecting device according to the present invention. Although the load transfer member is required to have a lower stiffness than that of the load sensor in the present invention, the members other than the load transfer member can have a higher stiffness than that of the load sensor. Therefore, the increased strength of the load-detecting device also contributes to the increase in stiffness of the load transfer member. As a result, the stiffness of the entire load-detecting device can be increased. Such a load-detecting device may be provided in various mechanisms as a structure.

Moreover, the load-detecting device according to the present invention may be interposed between a bumper reinforcement extending in a horizontal direction of the vehicle (the bumper reinforcement is connected to an energy absorber provided under a bumper cover of the vehicle) and the vehicle front sides of side members extending in a longitudinal direction of the vehicle so as to detect a load applied from the vehicle bumper side. If an impact on the bumper from a traveling direction of the vehicle (the front of the vehicle) is to be detected as a load, the detection of a load from the directions other than the vehicle traveling direction leads to an error for detection of the impact with high accuracy. Therefore, the load-detecting device according to the present invention, which is capable of detecting a load from a predetermined direction with good accuracy, is suitable for the detection of an impact load on the bumper. Moreover, since the load-detecting device of the present invention can be constructed to have a high stiffness as a whole, as described above, the load detection can withstand a large impact load on the bumper.

Furthermore, the load-detecting device according to the present invention may be provided between a seating face of a vehicle seat and a floor constituting a part of a vehicle body so as to detect a load applied to the seating face of the vehicle seat. In the case where a weight applied to the vehicle passenger seat is to be detected, the detection of a load from a longitudinal or horizontal direction of the vehicle produces an error in detection of the weight applied to the passenger seat with high accuracy. Therefore, the load-detecting device of the present invention, which is capable of detecting a load from the predetermined direction with good accuracy, is suitable for detecting the weight on the passenger seat for passenger detection.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Hereinafter, a load-detecting device of the present invention provided in a front end of a vehicle will be described as an example with reference to the accompanying drawings. A bumper cover is normally provided for the front end of the vehicle so as to serve to absorb any impact energy delivered to the front of the vehicle. The load-detecting device of the present invention is characterized by having high detection accuracy for a load applied to the front of the vehicle.

Figure 1:
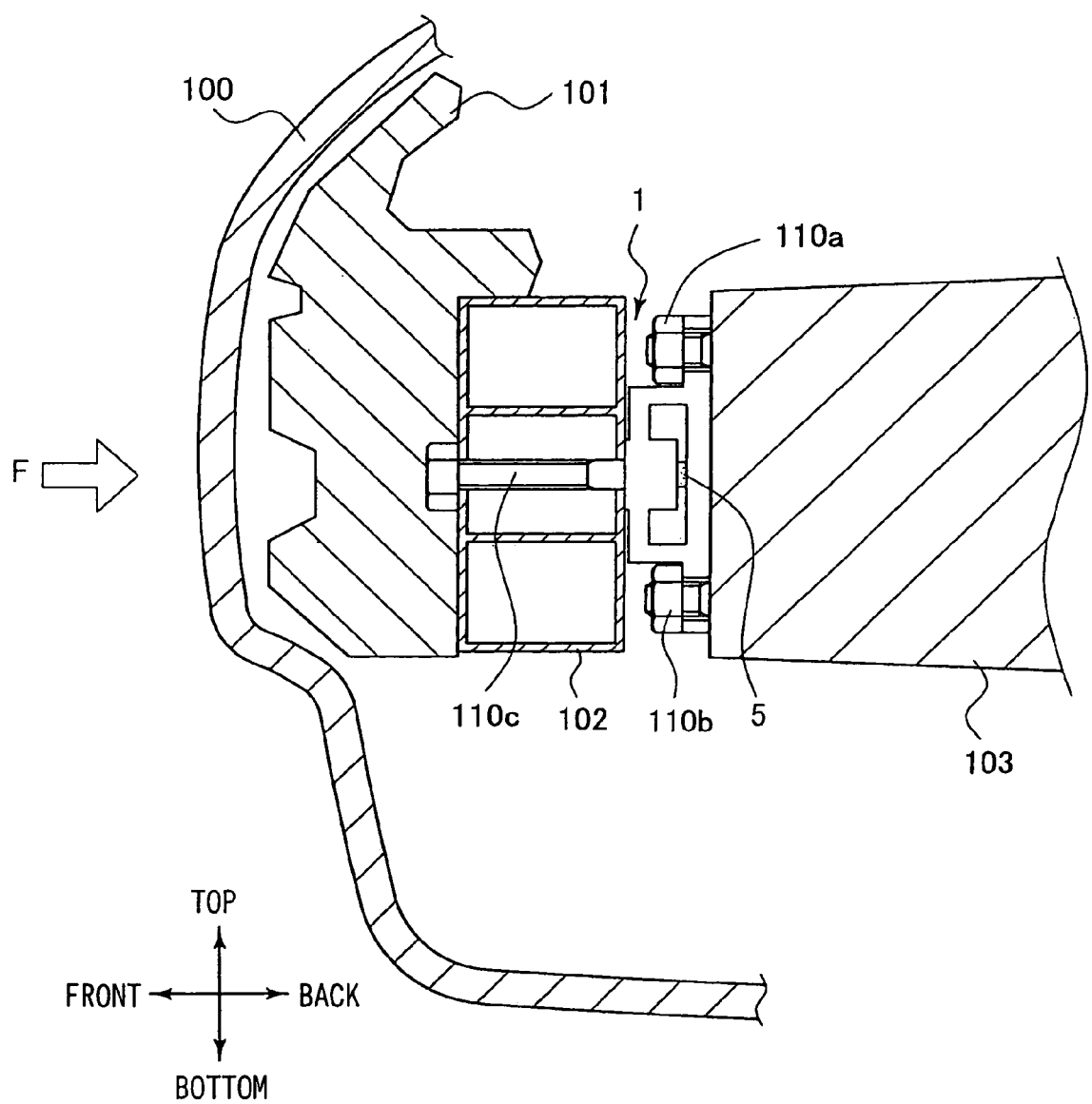
FIG. 1 is a partial cross-sectional view of a load-detecting device according to a first embodiment of the present invention installed on a vehicle.
Figure 2:
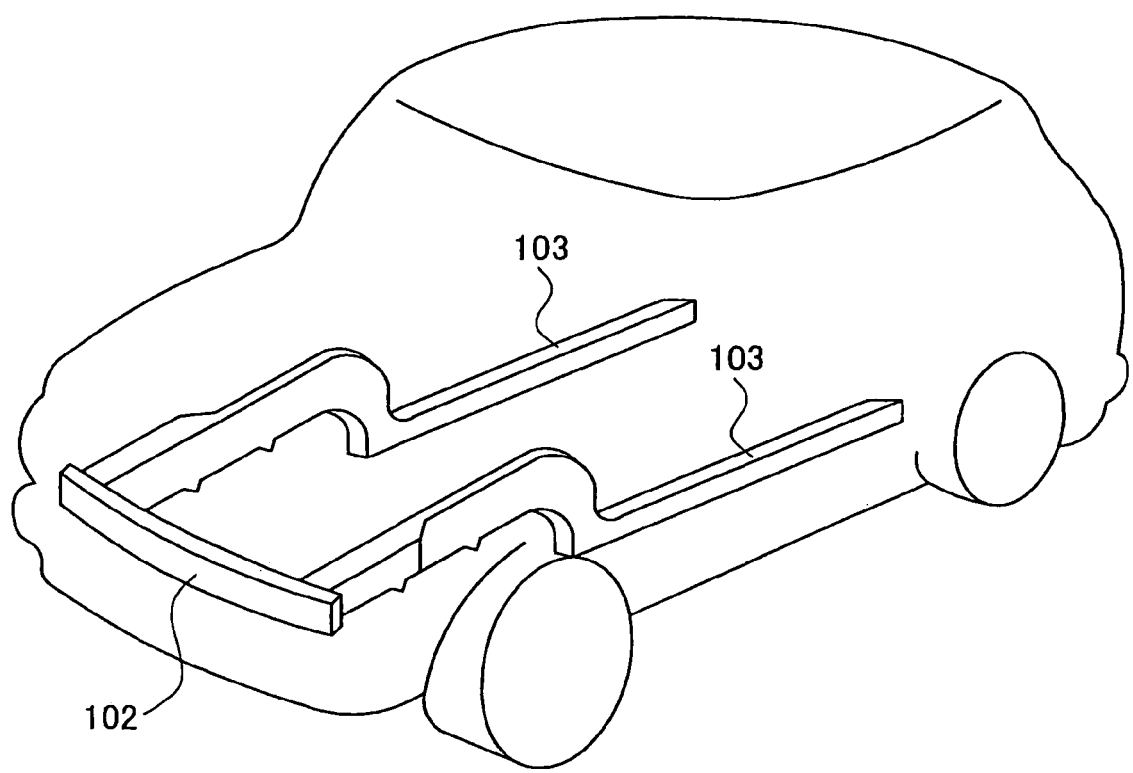
FIG. 2 is a perspective view of a vehicle.

FIG. 1 shows a structure of a front end of a vehicle. The front end of the vehicle shown in FIG. 1 includes an energy absorber 101 under a bumper cover 100 for absorbing impact energy to the bumper cover 100 by plastic deformation. The energy absorber 101 is provided between the bumper cover 100 and a bumper reinforcement member 102. The energy absorber 101 is screwed to the bumper reinforcement member 102 with a fastening member 110c composed of a bolt and a nut so as to be connected thereto. A load-detecting device 1 according to the present invention is interposed between the bumper reinforcement member 102 and side members 103 extending in a longitudinal direction of a vehicle body to form a vehicle body frame. FIG. 2 shows the positional relationship of the bumper reinforcement member 102 and the side members 103 in the vehicle body. In this case, the load-detecting device 1 and the bumper reinforcement member 102 are connected to each other by the fastening member 110c passing through the bumper reinforcement member 102. The load-detecting device 1 and the side members 103 are connected by screwing with fastening members 110a and 100b, each of which being composed of a bolt and a nut.

Figure 3:
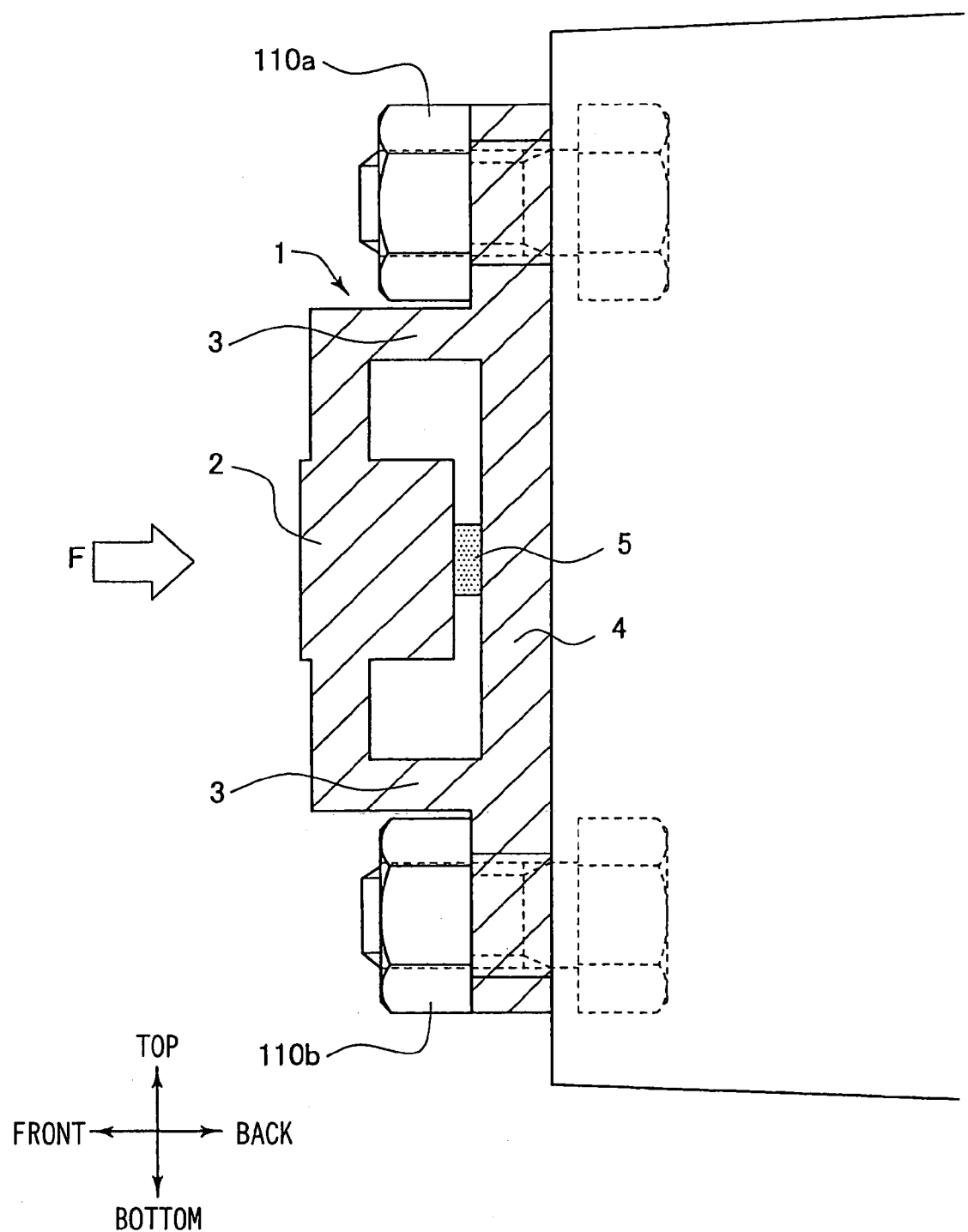
FIG. 3 is a cross-sectional view of the load-detecting device of FIG. 1.

FIG. 3 is an enlarged view of the load-detecting device 1 shown in FIG. 1. The load-detecting device 1 of the present invention includes a load sensor 5, a load transfer member 2, a load sensor supporting member 4, and the supporting members 3. The load transfer member 2 is connected to the bumper reinforcement member 102 (FIG. 1) without any gap therebetween. The load transfer member 2 transfers a load F applied to the bumper cover 100 from the front of the vehicle through the energy absorber 101 (FIG. 1) and the bumper reinforcement member 102 to the load sensor 5. The load sensor supporting member 4 is connected to the side members 103. The load sensor 5 is interposed between the load sensor supporting member 4 and the load transfer member 2. The supporting members 3 connect the load transfer member 2 and the load sensor supporting member 4 to each other. Since the load-detecting device 1 of the present invention is required to withstand a high strength impact to the bumper cover 100, it is desirable that the above-described components have a high stiffness.

The load sensor 5 used in the load-detecting device 1 according to the present invention is required to be formed of a material having a higher stiffness than that of the load transfer member 2. For example, a load sensor element made primarily of a ceramic material may be used as the load sensor 5. As a result, a load sensor 5 that is resistant to a larger load can be formed. In this case, the load sensor may be composed of a pressure-sensitive body and an insulator covering the pressure-sensitive body. The pressure-sensitive body includes a ceramic material having electric insulating properties as a matrix and particles, which are dispersed in the matrix so as to be electrically continuous, having a pressure resistance effect.

As a pressure resistance effect material for forming the pressure-sensitive body, the following materials can be used:

1. $(Ln_{1-x}Ma_x)_{1-y}MbO_{3-z}$ having a Perovskite structure, wherein $0<x\leq0.5$, $0\leq y\leq0.2$, $0\leq z\leq0.6$, Ln includes a rear earth element, Ma includes one type or more of the alkaline earth elements, and Mb includes one type or more of the transition metal elements;
2. $(Ln_{2-u}Ma_{1+u})_{1-v}Mb_2O_{7-w}$ having a layered Perovskite structure, wherein $0<u\leq1.0$, $0\leq v\leq0.2$, $0\leq w\leq1.0$, Ln includes a rear earth element, Ma includes one type or more of the alkaline earth elements, and Mb includes one type or more of transition metal elements;
3. Si; and
4. One or more of zirconia ($ZrO_2$), $Al_2O_3$, $MgAl_2O_4$, $SiO_2$, $3Al_2O_3 \cdot 2SiO_2$, $Y_2O_3$, $CeO_2$, $La_2O_3$, $Si_3N_4$ plus an extremely small amount of an additional element. In this embodiment, zirconia ($ZrO_2$), which has a high strength and a high fracture toughness at a normal temperature, is used. Since the structure and the formation method of the pressure-sensitive body have already been described in the above-cited Japanese Patent Laid-Open Publication No. Hei 15-240632, and Japanese Patent Laid-Open Publications No. 2001-242019 and No. 2002-145664, for example, the detailed description thereof is herein omitted.

Moreover, similar to the pressure-sensitive body, it is effective to use a primarily ceramic material for the insulator that covers the pressure-sensitive material. Materials such as zirconia ($ZrO_2$), $Al_2O_3$, $MgAl_2O_4$, $SiO_2$, $3Al_2O_3 \cdot 2SiO_2$, $Y_2O_3$, $CeO_2$, $La_2O_3$, and $Si_3N_4$ can alternatively be used. In this embodiment, the same zirconia ($ZrO_2$) as that used for the pressure-sensitive body or zirconia ($ZrO_2$), to which a pressure resistant material is added so as not to have electric continuity, is used.

In the element having the structure as described above, upon application of a pressure by the application of a load, an ohmic resistance is varied based on the applied pressure. Therefore, the load can be detected based on the variation in ohmic resistance.

A material of the load sensor element used for the load-detecting device according to the present invention may be a silicon single crystal. The silicon single crystal allows the detection of a load by a variation in ohmic resistance based on the applied pressure as described above and has a high stiffness. A piezoelectric element may alternatively be used. However, since piezoelectric elements tend to have a low resistance against large loads, it is required to have a structure for reducing a load directly applied to the element in advance.

Figure 4:
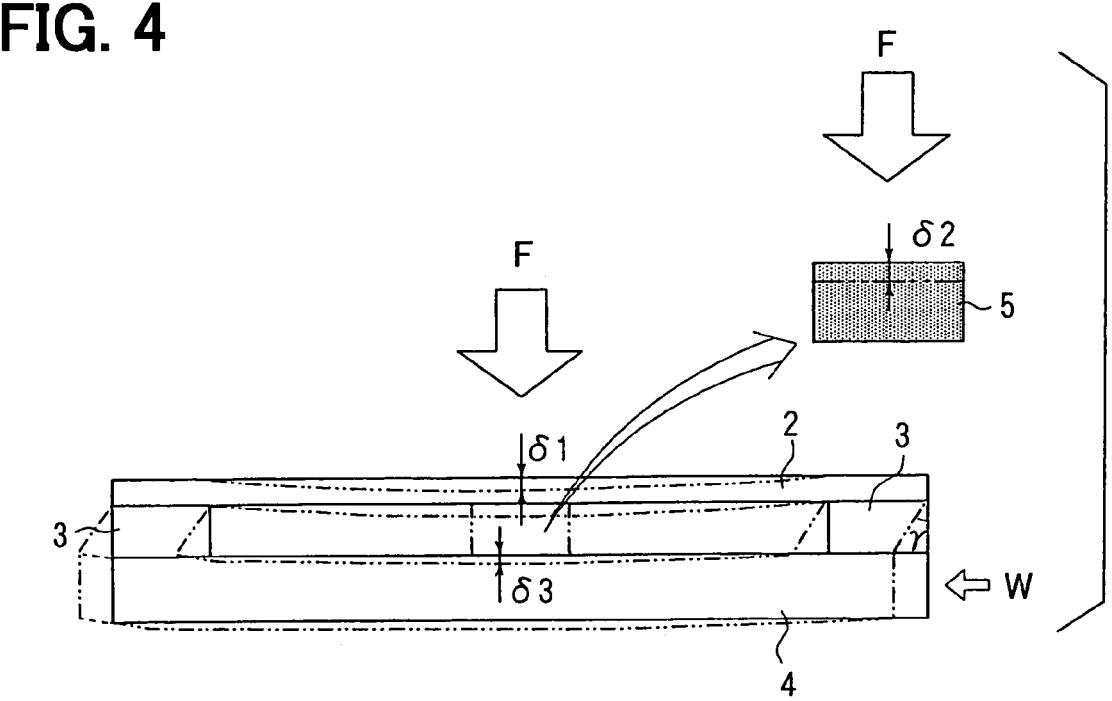
FIG. 4 is a side view illustrating the deformability of the load-detecting device of FIG. 1.

FIG. 4 is a view for illustrating a load allocation ratio of the load transfer member 2 to the load sensor 5 when a load is applied to the load-detecting device 1 of this embodiment. Assuming that an elastic displacement (in this case, a deflection displacement) of the load transfer member 2 upon application of the load F to the load transfer member 2 in the case where the load sensor 5 is not provided is represented by $\delta 1$ and an elastic displacement of the load sensor 5 when the load F is directly applied to the load sensor 5 is represented by $\delta 2$, a load allocation ratio of the load sensor 5 is obtained to be: $\delta 1/(\delta 1+\delta 2)$. Therefore, a load quota Fs allocated to the load sensor 5 upon application of the load F is: $Fs=F\times\{\delta 1/(\delta 1+\delta 2)\}$. Accordingly, the load sensor 5 detects Fs. As the value of Fs increases, the detection sensitivity of the load-detecting device according to the present invention increases.

In the case of FIG. 4, it is desirable that $\delta 1>\delta$ so as to enable the detection of a load by the load-detecting device 1 with high accuracy. If $\delta 1 \leq \delta 2$, almost all the applied load F is used for deflection deformation of the load transfer member 2. Therefore, the load Fs applied to the load sensor 5 is small to decrease the elastic displacement, resulting in a lesser degree of detection sensitivity of the load sensor 5 to the load F. Specifically, it is necessary to examine a stiffness ratio between the two members so as to provide a high load allocation ratio for the load sensor 5.

Moreover, the detection sensitivity of the load-detecting device 1 depends on the elastic displacement $\delta 2$ of the load sensor 5. Thus, it is necessary to achieve a large elastic displacement $\delta 1$ of the load transfer member 2 and a small elastic displacement $\delta 3$ of the load sensor supporting member 4 so as to obtain a large elastic displacement $\delta 2$ of the load sensor 5. Therefore, in order to enable the detection of a load by the load-detecting device 1, at least $\delta 1>\delta 3$ is required to be established. Furthermore, to help achieve highly sensitive and accurate load detection, it is desirable that $\delta 2>\delta 3$. Each of the elastic displacements $\delta 1$ to $\delta 3$ are the amount of elastic displacement in the same direction as the load application direction F.

The supporting members 3 are provided on the both sides of the center part of the load transfer member 2 so that elastic deformation (deflection) is allowed in the center part of the load transfer member 2 (in an elastic displacement area in this embodiment). Since the deflection is required to be generated in the center part of the load transfer member 2, the supporting members 3 are required to be formed of a material having a stiffness higher at least than that of the load sensor 5 in the load application direction.

However, each of the members is required to have a high stiffness in the direction perpendicular to the load application direction. The supporting members 3 and the load sensor 5 are not in contact with each other. Therefore, even if an external force perpendicular to the load application direction in FIG. 4 is applied to the supporting members 3, the load is shared by the load transfer member 2 and the load sensor supporting member 4 and is not transferred to the load sensor 5.

On the other hand, however, a shearing force W is sometimes generated between the load transfer member 2 and the load sensor supporting member 4. In this case, the shearing force W is also applied to the load sensor 5 in accordance with an elastic displacement γ of the supporting members 3 to degrade the detection accuracy of the load sensor 5. Since the shearing force W is generated by the elastic deformation of the supporting members 3, it is preferable that the supporting members 3 have a higher stiffness than that of the load sensor 5 in the direction perpendicular to the load application direction as well as in the load application direction.

Since the load sensor 5 in this embodiment is a ceramic load sensor made primarily of a zirconia ceramic material, the load sensor 5 has a remarkably high stiffness and a satisfactory resistance to the load F. In this case, even if the load F is applied, the load sensor 5 has a high stiffness and generates an extremely small elastic displacement. By the selection of the stiffnesses of the load transfer member 2 and the load sensor supporting member 4, the detection sensitivity of the load sensor 5 can be enhanced. Moreover, in regard of the stiffness of the other members constituting the load-detecting device 1 of the present invention such as the load transfer member 2 and the load sensor supporting member 4, since a material for these members can be selected based on the load sensor 5 having a high stiffness, a material having a relatively high stiffness can be selected. Therefore, the load-detecting device 1 can be constructed so as to have a high stiffness as a whole. Specifically, the strength of the load sensor 5 can be enhanced in any direction, allowing the load sensor 5 to be provided between the constituting members.

The load-detecting device of the present invention uses a sandwich structure utilizing a diaphragm structure or a bridged-beam structure, in which the load sensor 5 is interposed between the elastic members (the load transfer member 2 and the load sensor supporting member 4), as shown in FIG. 3. As a result, the load applied from the direction other than the load detection direction is not transferred to the load sensor 5 but to the supporting members 3. Therefore, the load-detecting device 1 is able to have a high stiffness in the load direction. Moreover, since the load transfer member 2 has a low spring stiffness in the load detection direction, elastic deformation (deflection) is likely to be generated. Therefore, almost all the applied load is allocated to the load sensor 5. Accordingly, the load sensor 5 can achieve the detection with high accuracy. Specifically, the load sensor 5 used in the present invention can detect the load only in a necessary direction with good accuracy, excluding the effects of a variation in load in the directions other than the load detection direction. Moreover, if the load sensor 5 is made of a ceramic, the entire load-detecting device can have a high strength. In this case, since the load applied to a detection plane of the load sensor 5 can be increased, the use of a ceramic is also suitable for the reduction of size. As described above, the load-detecting device of the present invention provides both high accuracy and high strength so as to be reduced in size.

Furthermore, the load sensor 5 is interposed between the load transfer member 2 and the load sensor supporting member 4 so as to be subjected to an appropriate preload before a load is applied. As a result, a load in a tensile direction can also be detected.

In the above-described embodiment, the load-detecting device for detecting an impact load from the front of the bumper of the vehicle has been described. However, the present invention is not limited thereto. Various changes are possible based on the knowledge of those skilled in the art without departing from the scope of the appended claims. While the above-described embodiment is regarded as the first embodiment, a second embodiment of the present invention will now be described.

Figure 5:
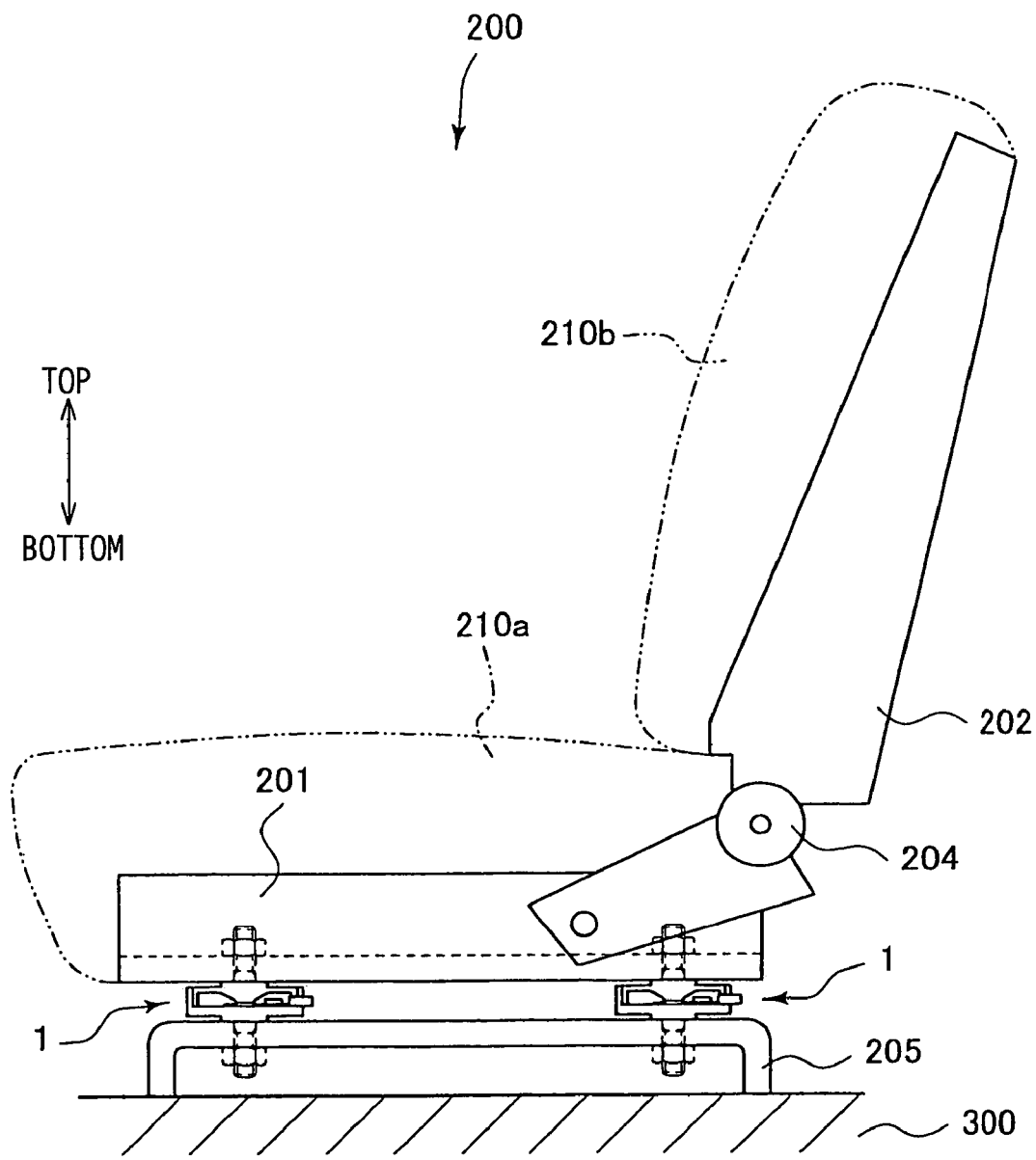
FIG. 5 is a side view of vehicle seat and a load-detecting device according to a second embodiment of the present invention.

FIG. 5 shows the second embodiment of the present invention, illustrating a simplified structure of a passenger seat 200 of a vehicle equipped with the load-detecting device 1. The passenger seat 200 includes a bottom frame section 201 for forming a seating face, a back frame section 202 for a back rest face, and a connecting section 204 for pivotally supporting the back frame section 202 to the bottom frame section 201. The passenger seat 200 is composed of a seat cushion 210a on the seating face and a seat back 210b serving as a back rest. An arm 205 is fixedly provided on a floor 300 of the vehicle. The load-detecting device 1 according to the present invention is provided between the arm 205 and the bottom frame section 201 so as to be able to detect a load applied to the seat, that is, the weight of a passenger.

Figure 6:
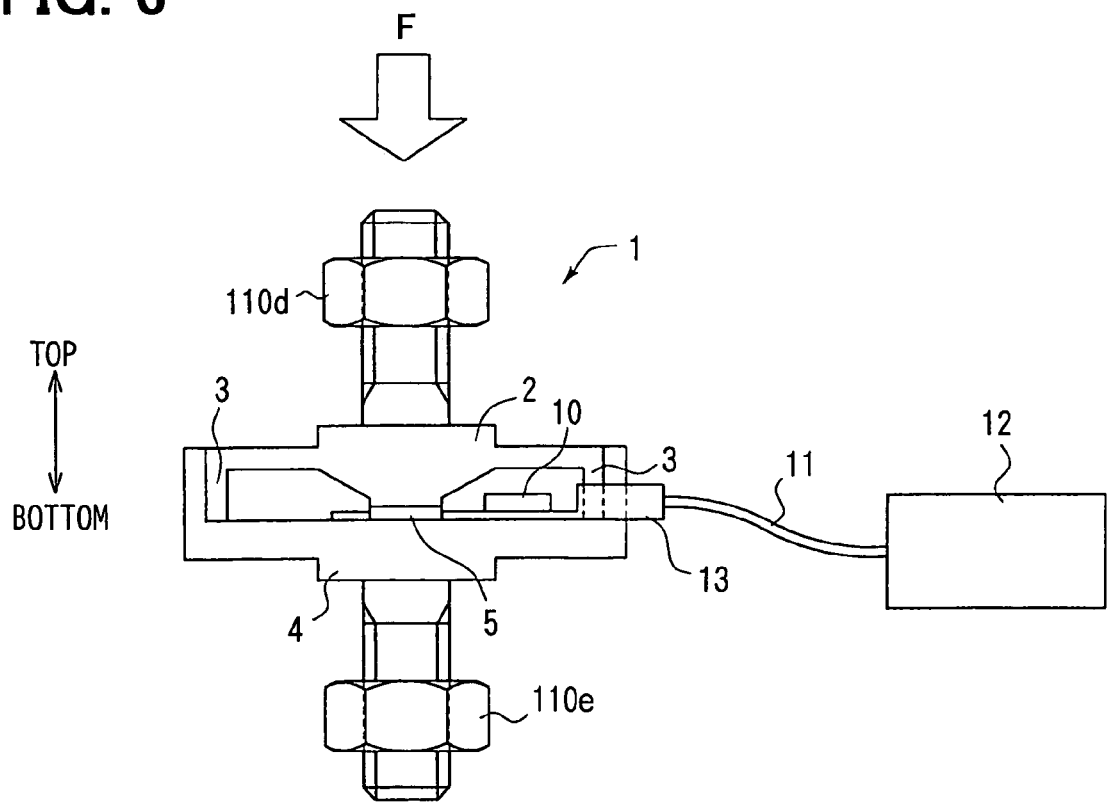
FIG. 6 is a side view of the load-detecting device of FIG. 5.

FIG. 6 is an enlarged view of the load-detecting device shown in FIG. 5. The load-detecting device 1 includes the load transfer member 2, the supporting members 3, the load sensor supporting member 4, and the load detection sensor 5 as the load-detecting device shown in FIG. 3. In the load-detecting device shown in FIG. 5, however, the load transfer member 2 and the supporting members 3 form an integral structure, and the supporting members 3 are fitted and fixed by upwardly projecting portions provided on the both ends of the load sensor supporting member 4. A fastening member 110d serves to be fastened to the frame section 201 forming the seating face, whereas a fastening member 110e serves to be fastened to the arm 205 fixedly provided on the floor 300 of the vehicle. Each of the fastening members 110d and 110e is composed of a bolt and a nut in this embodiment. Since the principle of load detection is the same as that of the first embodiment described above, the detailed description thereof is herein omitted.

Although not described in the above embodiment, the load sensor 5 according to the present invention has a varying internal resistance based on the elastic displacement δ2 under the application of a load. The load sensor 5 detects the variation in internal resistance to obtain the load. In FIG. 6, an integrated circuit (IC) 10 is mounted on a bus bar 13. The IC 10 and the load sensor 5 are electrically connected through a wiring section (not shown) provided on the bus bar 13. The IC 10 is connected to a connector 12 through the wiring section on the bus bar 13 and a signal line 11. The IC 10 is electrically connected to the exterior through the connector 12. As a result, a predetermined voltage is applied to the load sensor 5 so as to input a fluctuation in the voltage signal to the predetermined IC 10 as an output signal. The IC 10 computes the input signal and then performs correction processing and the like under various conditions so as to compute the load applied to the load-detecting device 1. The result of computation is output from the connector 12 through the signal line 11 to the exterior, for example, to a vehicle control unit.

Figure 7A:
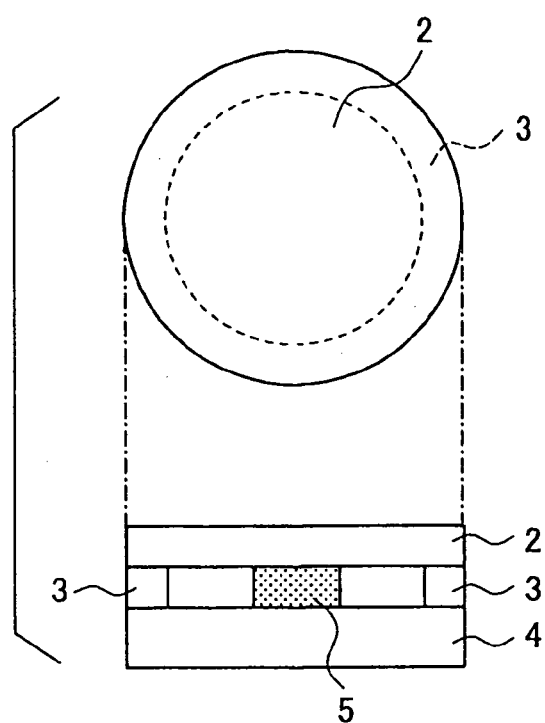
FIG. 7A is a plan and side view of a load-detecting device according to a third embodiment of the present invention.
Figure 7B:
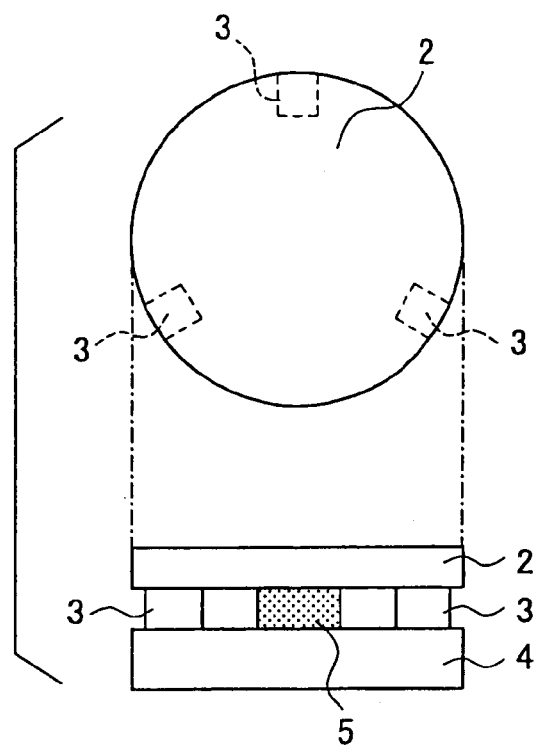
FIG. 7B is a plan and side view of a load-detecting device according to a fourth embodiment of the present invention.
Figure 7C:
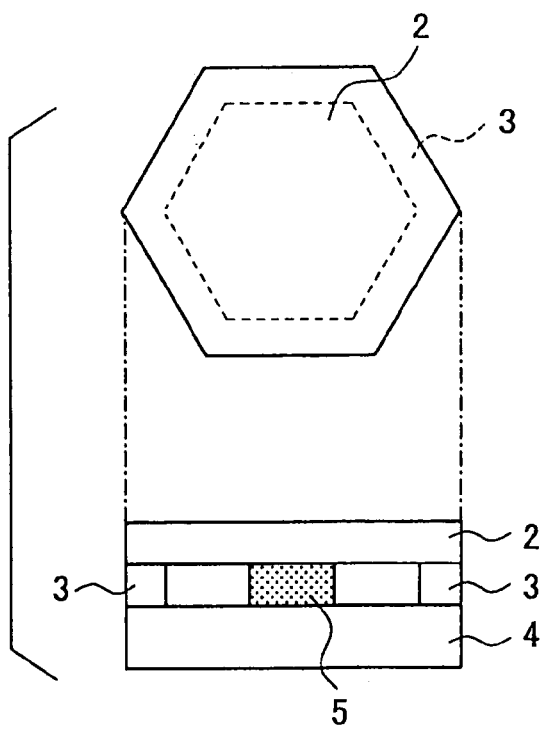
FIG. 7C is a plan and side view of a load-detecting device according to a fifth embodiment of the present invention.

The present invention is not limited to the structure described in the above-described embodiments. For example, other embodiments, as shown in FIGS. 7A to 7C, are within the scope of the present invention. FIG. 7A shows a circular load-detecting device 1. The center of the load transfer member 2 forms an elastic displacement area under the load F. The supporting member 3 is provided on the outer circumferential area. The load sensor 5 is interposed between the elastic displacement area corresponding to the center area of the load transfer member 2 and the load sensor supporting member 4. FIG. 7B shows an alternative circular load-detecting device 1. The center of the load transfer member 2 forms an elastic displacement area under the load F. The supporting members 3 are provided at three positions in the outer circumferential area. The load sensor 5 is interposed between the elastic displacement area corresponding to the center area of the load transfer member 2 and the load sensor supporting member 4. The three supporting members 3 are symmetrically provided about center of the load sensor 5. FIG. 7C shows a regular hexagonal load-detecting device 1. The center of the load transfer member 2 forms the elastic displacement area under the load F. The supporting member 3 is provided in the outer circumferential area. The load sensor 5 is interposed between the elastic displacement area corresponding to the center of the load transfer member 2 and the load sensor supporting member 4. As described above, the structure of the load-detecting device according to the present invention is as follows. The supporting member 3 is connected so that the elastic deformation area is provided for the load transfer member 2. Furthermore, the load sensor 5 is provided so as to be in contact with the elastic displacement area of the load transfer member 2. Furthermore, it is desirable that the load sensor 5 be provided at the center of gravity of the elastic displacement area and that the supporting members 3 be arranged symmetrically about the center of the load sensor 5 so as to detect the load applied to the load transfer member 2 in a well-balanced manner. Furthermore, the supporting members 3 and the load sensor supporting member 4 are required to be connected to each other so as to have a resistance against an external force from a direction different from the load detection direction.

What is claimed is:

1. A load-detecting device comprising:
    a supporting member;
    a load transfer member supported by the supporting member so as to include an elastic displacement area in which an elastic displacement is generated upon application of a force from a predetermined direction;
    a load sensor provided in contact with the elastic displacement area of the load transfer member, the load sensor detecting a load based on the elastic displacement; and
    a load sensor supporting member for supporting the load sensor, the load sensor supporting member being in connection with the supporting member, wherein
    the load transfer member, the load sensor, and the load sensor supporting member are provided in this order along the predetermined direction, wherein
    the supporting member is provided so as not to be in contact with the load sensor, and
    the load transfer member has a lower stiffness in the predetermined direction than the load sensor.

2. The load-detecting device according to claim 1, wherein
    the supporting member has a lower stiffness in the predetermined direction than that in a different direction.

3. The load-detecting device according to claim 1, wherein
    the load sensor contacts a center of gravity of the elastic displacement area.

4. The load-detecting device according to claim 1, wherein
    the supporting member includes a plurality of supporting members provided symmetrically about an axial line extending in the predetermined direction from the center of gravity of the elastic displacement area.

5. The load-detecting device according to claim 1, wherein
    the load sensor is formed primarily of zirconia and $La_{1-x}Sr_xMnO_3$, wherein x is greater than or equal to zero and less than or equal to one, the load sensor having a pressure resistance effect.

6. The load-detecting device according to claim 1, wherein
    the load-detecting device is interposed between a bumper reinforcement member extending in a horizontal direction of a vehicle and vehicle front sides of side members extending in a longitudinal direction of the vehicle so as to detect a load applied from a vehicle bumper side, the bumper reinforcement member being connected to an energy absorber provided under a bumper cover of the vehicle.

7. The load-detecting device according to claim 1, wherein
    the load-detecting device is provided between a seating face of a vehicle seat and a floor of a vehicle body so as to detect a load applied to the seating face of the vehicle seat.

* * * * *